(12) United States Patent
Kusko et al.

(10) Patent No.: US 7,831,863 B2
(45) Date of Patent: Nov. 9, 2010

(54) METHOD FOR ENHANCING THE DIAGNOSTIC ACCURACY OF A VLSI CHIP

(75) Inventors: Mary P. Kusko, Hopewell Junction, NY (US); Gary W. Maier, Poughquag, NY (US); Franco Motika, Hopewell Junction, NY (US); Phong T. Tran, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 11/622,055

(22) Filed: Jan. 11, 2007

(65) Prior Publication Data

US 2008/0172576 A1   Jul. 17, 2008

(51) Int. Cl.
*G06F 11/00* (2006.01)
(52) U.S. Cl. ....................................... 714/33
(58) Field of Classification Search ............ 714/33
See application file for complete search history.

(56) References Cited

U.S. PATENT DOCUMENTS 4,817,093 A * 3/1989 Jacobs et al. ............ 714/728
2001/0003427 A1 * 6/2001 Ferguson et al. ........... 324/765
2004/0216061 A1 * 10/2004 Floyd et al. .................. 716/4
2005/0010890 A1 * 1/2005 Nehmadi et al. ............ 716/19
2006/0041813 A1 * 2/2006 Rajski et al. ............... 714/742
2006/0066338 A1 * 3/2006 Rajski et al. ............... 324/765

OTHER PUBLICATIONS

Search Report and Written Opinion. International Serial No. PCT/US08/50595.

* cited by examiner

*Primary Examiner*—Bryce P Bonzo
*Assistant Examiner*—Amine Riad
(74) *Attorney, Agent, or Firm*—H. Daniel Schnurmann (57) ABSTRACT

A diagnostic process applicable to VLSI designs to address the accuracy of diagnostic resolution. Environmentally based fail data drives adaptive test methods which hone the test pattern set and fail data collection for successful diagnostic resolution. Environmentally based fail data is used in diagnostic simulation to achieve a more accurate environmentally based fault callout. When needed, additional information is included in the process to further refine and define the simulation or callout result. Similarly, as needed adaptive test pattern generation methods are employed to result in enhanced diagnostic resolution.

18 Claims, 6 Drawing Sheets

METHOD FOR ENHANCING THE DIAGNOSTIC ACCURACY OF A VLSI CHIP

FIELD OF THE INVENTION

This invention generally relates to the field of Design Automation, and more particularly, to a method for enhancing diagnostic and creating fault behavioral effects by changing the environment when testing and diagnosing VLSI chips and subsequently using the environment information to result in enhanced diagnostic capabilities.

BACKGROUND OF THE INVENTION

A typical problem often encountered in testing and subsequent diagnosis of complex VLSI devices is the availability of an effective and precise diagnostic methodology to pinpoint the root cause of a broad range of modeled and un-modeled faults. The rapid integration growth of these VLSI devices and associated high circuit performance and extremely complex semiconductor processes have intensified old and introduced new types of defects. The defect diversity and subtlety, accompanied by limited fault models, usually results in large and insufficient pattern sets, inadequate diagnostic fail data collection, ineffective diagnostic simulations, all of which result in a poor diagnostic accuracy. The resulting problems generate a growing number of "no root cause fail found", which typically end in semiconductor failure analysis laboratories.

Identifying faults and pinpointing the root cause of the problem in a large logic structure requires high resolution diagnostic calls for isolating the defects and successfully completing the Physical Failure Analysis (PFA) defect localization that ultimately leads to higher yields. The resolution of state of the art logic diagnostic algorithms and techniques depend on the number of tests and the amount of passing and failing test result data available for each fault. Oftentimes, conventional methods of generating test patterns, collecting associated test results, and utilization of all fail test data in diagnostics simulations, are insufficient to achieve the desired diagnostic resolution.

Figure 1:
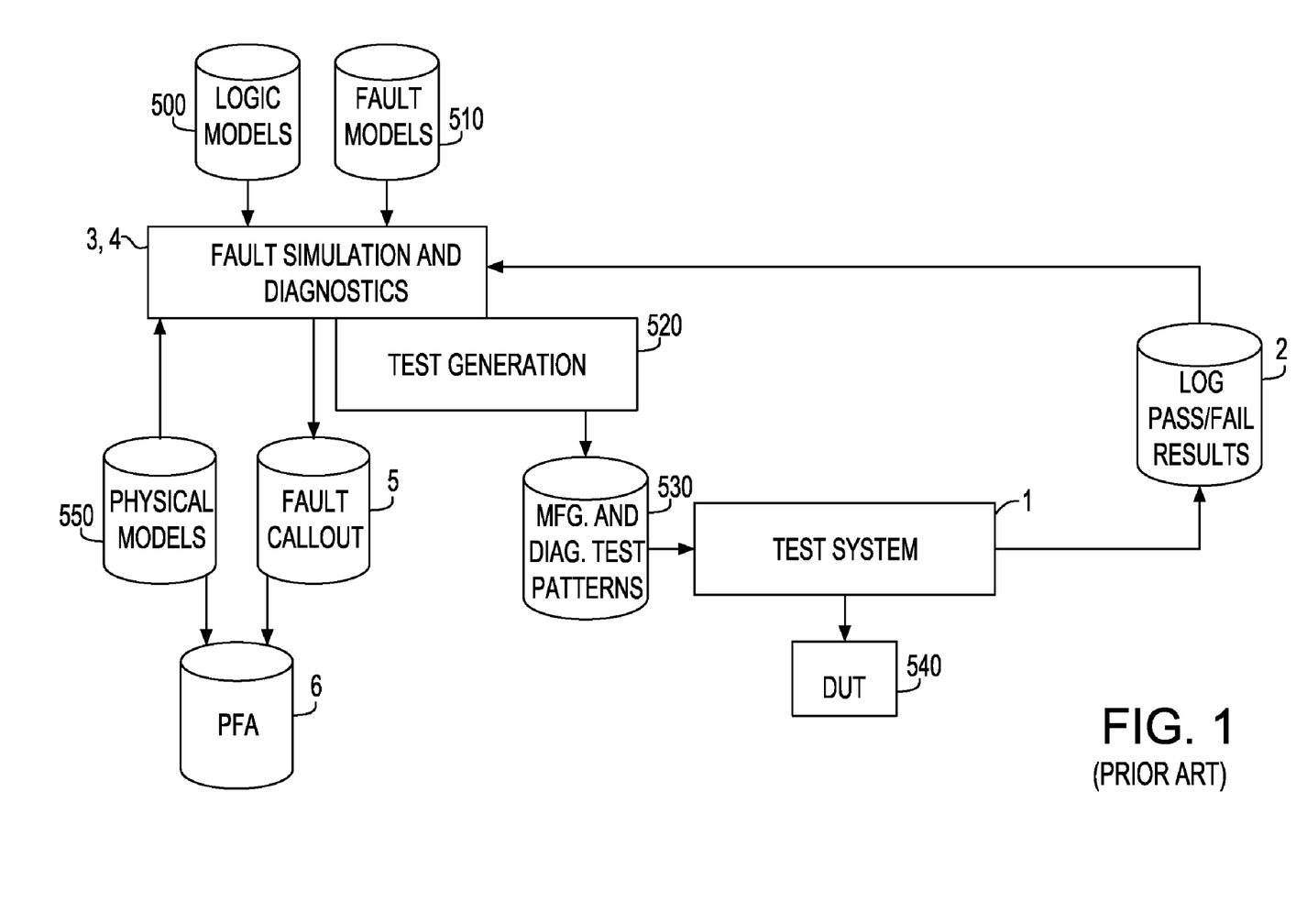
FIG. 1 is a diagram showing a prior art flow for a typical diagnostic process using test patterns applied to a DUT and then feeding the responses into a diagnostic simulation with the resulting fault callout(s) being used for PFA.

Referring to FIG. 1, there is shown a diagram illustrating a prior art system for a typical diagnostic process (4) using test patterns (530) applied to a DUT (540) and subsequently feeding the responses into a diagnostic simulation (3) with the resulting fault callout(s) (5) being used for PFA (6).

Test Pattern Generation

Test patterns (530) are needed in manufacturing test to detect defects. Tests can be generated using a variety of methods. A representative model of the defect is typically employed and is referred to as a fault model (510). The fault models are advantageously used to guide the generation and measure the final pattern effectiveness. The stuck-at fault model is the most commonly used model, but other models have been successfully used in industry. For a stuck-at fault model, faults are assigned to the input and outputs of each primitive block for both stuck-at-0 (S-a-0) and stuck-at-1 (S-a-1) conditions. Examples of primitive blocks, i.e., the lowest logical level in any design include AND, OR, NAND, NOR, INV gates, and the like. For each fault, a generator determines the conditions necessary to activate the fault in the logic, based on some logic model (500), allowing the conditions to propagate the fault to an observation point). Tests are generated for each fault in the total set of chip faults and methods are then used to compress these patterns to maximize the number of faults tested per pattern.

In a manufacturing environment, tester time and tester memory are of prime importance; therefore, steps are taken to ensure that the patterns are as efficient as possible by having the test system (1) testing the maximum number of faults per pattern (although they are more difficult to diagnose).

At final test, patterns are applied to the device under test (hereinafter referred to as DUT) (540) and test results data is collected (2). Test results data typically contains both passing and failing patterns and the specific latches or pins ("observation points") that failed and how they failed. To determine which fault explains the fail, the fail data is loaded into a diagnostic simulator (4). Each fault is analyzed to determine whether it explains the fail or set of fails. Resulting from this simulation (3) is a call-out report that lists each of the suspect faults and a confidence level at which the fault can explain the fail. Callouts (5) can range from precise calls of 100% (i.e., an exact match) to lesser confident numbers. Physical failure analysis (PFA) (6) requires locating the failure at the precise location, and as such, a highly accurate call-out is needed. Often, the resultant diagnostic callout does not give a sufficiently clear indication of the fault location, and may even provide a totally wrong callout. In situations where several faults are identified but none have a precise callout, a finer resolution is required. A focused set of patterns can be created based on a subset of faults called out during diagnostic simulation. In a typical fault simulation (3), the fault is marked as detected once this process has been completed.

Fault Model Models Defects

Physical defects can manifest themselves in many ways and often do not match any fault model (510). By expanding the method in which test patterns are applied, the likelihood of being able to also detect unmodeled faults increases. Conventional methods for generating test patterns, applying them, collecting associated test results, and exercising conventional diagnostics algorithms are insufficient to achieve the desired diagnostic accuracy.

Diagnostic Simulation

Figure 2:
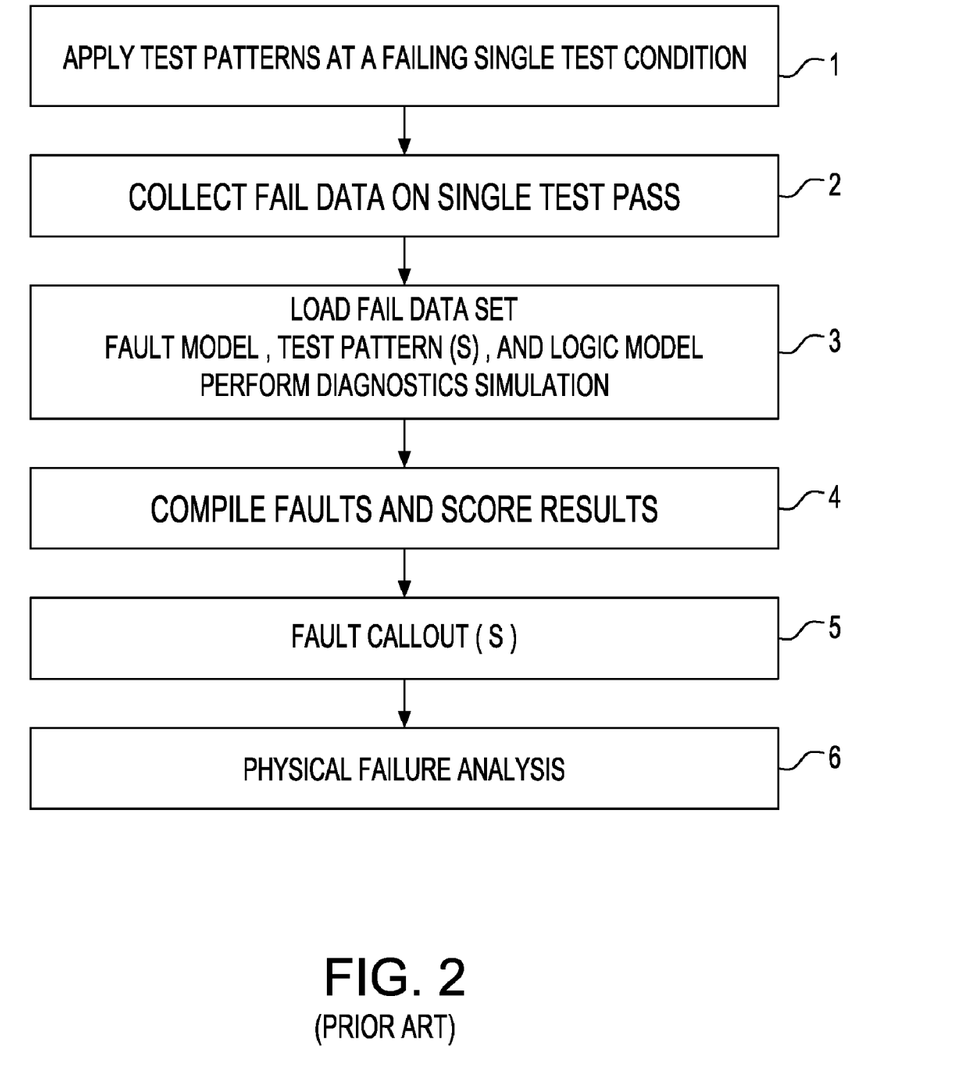
FIG. 2 is a flow chart showing a prior art diagnostic flow illustrating how to perform diagnostic simulation based on appropriate fault models, test patterns, and an appropriate logic model of the DUT.

Referring now to FIG. 2, a flow chart is shown illustrating a conventional diagnostic methodology typically used in industry, applicable to final test of a VLSI die or multi-chip module, and which is used for determining the root cause of failure(s) and, ultimately, steps for fixing the problem causing the failure.

The chip or module to be tested is described in the form of logic model(s) (500) (see FIG. 1) describing the DUT (540). Examples of such logic models (500) can take the form of a high level representation of the logic such as behaviorals or, at the other end of the spectrum, as a netlist comprising primitives (NOR, NAND, and the like) and their respective interconnects.

A set of test patterns also known as test vectors, is generated using one of several ATPGs (Automatic Test Patterns Generators) (520) which, depending on the size and complexity of the logic, may include one or more deterministic pattern generators, weighted adaptive random pattern generators, pseudo-random pattern generators and the like.

Still referring to FIG. 2, in block 1, it is determined at the completion of the test (i.e., after applying all the test patterns known a priori to detect the presence of any failures), whether the chip or module passes or fails the test. Assuming that the answer is 'yes', the DUT is scribed, diced and mounted onto the next level of packaging. Alternatively, if the device under test fails during testing, the corresponding failing data is collected (block 2) and is processed into a set of diagnostic simulation programs (block 3) designed to localize the failure. The diagnostic simulation is performed using the logic model of the DUT and the test patterns that were applied which detected the fault in the DUT. The intent of the diagnostic tool is to determine the fault or set of faults which explain the fail data. The outcome of the diagnostic tool is referred to a fault callout. Typically associated with a fault callout is a measure of how well each fault in the callout explains the occurrence of the physical failure (block 5). This performance measure provides a confidence level. The fault callout is then preferably inputted to a physical failure analysis (PFA) process (block 6), wherein the correlation between logic failures is coupled to actual physical failures. Locating the physical failures makes it possible to determine the root cause of the problem allowing the engineer to take the necessary steps to fix the problem.

Therefore, there is a need in industry for a test methodology that provides extended diagnostic capabilities under diverse environmental test conditions to acquire specific device responses and fully utilizing those responses in a new enhanced diagnostics process which results in a more accurate diagnostic.

OBJECTS AND SUMMARY OF THE INVENTION

Accordingly, it is a primary object of the invention to provide a method for enhancing the diagnostic accuracy by including all of the fail results of the diagnostics process from testing a DUT under a plurality of environments.

It is another object to provide enhanced diagnostics simulations and enhanced diagnostic results scoring algorithms that utilize fault behavioral information that results from the plurality of test conditions.

It is a further object to include parallel or successive enhanced simulations and enhanced diagnostic results scoring.

It is still another object to include the environment test condition with the recorded fail results.

It is yet another object to use device parameters as well as manufacturing process data to define and refine the environmental conditions for test.

It is still a further object to adjust the environmental test conditions based upon the diagnostic simulation results.

It is yet a further object to employ adaptive test techniques to create test patterns to further refine the diagnostic resolution.

It is a yet another object to create a unique subset of environmental diagnostic patterns generated from the first pass diagnostics results to re-stimulate a more targeted set of logic paths that were not understood at initial test.

It is a further object to include additional design and process data such as physical and device models, process parameters, and complex fault models derived from these models and parameters.

These and other objects, advantages and aspects of the invention are achieved by providing a method for enhancing diagnostic resolution based on including environmental conditions, the method including the steps of: a) creating a set of test patterns; b) defining a set of environmental test conditions; c) applying the test patterns under the defined environmental test conditions; d) collecting fail responses alongside with the respective environmental test conditions; e) executing a diagnostic simulation and callout scoring that take into account the environmental data; f) performing a physical failure analysis when the score is recorded at a high confidence level; and g) if the score lacks the necessary confidence level, applying one of several techniques to refine and enhance the score to the necessary confidence level. These include but are not limited to: i) using adaptive test generation methods to create an enhanced set of patterns for test; ii) modifying and adjusting the environment conditions and reapplying the full set or a subset of the test patterns; iii) bringing in additional design and/or process information to refine the callout that includes but is not limited to device data, physical data, process information, alternate fault models; and iv) adjusting the sequence and content of the tests to enhance the diagnostic fail data collection and improve the diagnostic simulation.

Accordingly, the method of the present invention achieves an accurate, high confidence fault callout by including environment data in the entire diagnostic process which includes simulation and fault resolution.

In one aspect of the invention, fail data logs from various test environments are fully utilized in successive or simultaneous simulations and scoring algorithms and reusing the results of each simulation. This provides information previously discounted as valueless or too complex for single stuck fault simulations. This process further reuses previously discounted data, like bad results to steer the algorithms through a variety of "what if?" considerations. Environmental stress applied to any fault creates a variety of behaviors that can be dynamically modeled if considered during each unique environmental single stuck fault simulation and sequential scoring algorithm.

In another aspect of the invention, the inventive process fully sensitizes the intrinsic parametric and parasitic behavior of complex faults by also applying adaptive test methods. This is achieved by dynamically creating unique environmental patterns, changing tests or creating new tests, altering test flows, and/or adjusting all the environmental conditions while applying these tests.

In still another aspect of the invention, a variety of design and process information is utilized to further enhance resolution or drive further improved simulations and scoring. This information includes but is not limited to: physical design information, device models, and complex fault models derived from the design data, and unique and varying process conditions in each environment.

In yet another aspect of the invention, the enhanced diagnostics process provides a second pass set of diagnostics patterns after the first patterns environmental fail data has been fully simulated. An improved and more targeted set of patterns can be used to only stimulate a subset of "best guess" affected devices and net, while removing all the surrounding random fill patterns and effects generated from the first manufacturing Test Pattern Generation (TPG). These patterns are reapplied under various environmental conditions a second time and re-logged for a more focused set of fail data logs.

The entire enhanced diagnostics process including all objects provides a comprehensive diagnostics system to significantly improve the isolation of the most complex faults in a design manufactured in the narrower set of design and process windows in today's technologies.

BRIEF DESCRIPTION OF THE DRAWINGS

The accompanying drawings, which are incorporated in and which constitute part of the specification, illustrate the presently preferred embodiments of the invention which, together with the general description given above and the detailed description of the preferred embodiments given below serve to explain the principles of the invention.

DETAILED DESCRIPTION OF THE INVENTION

Figure 3:
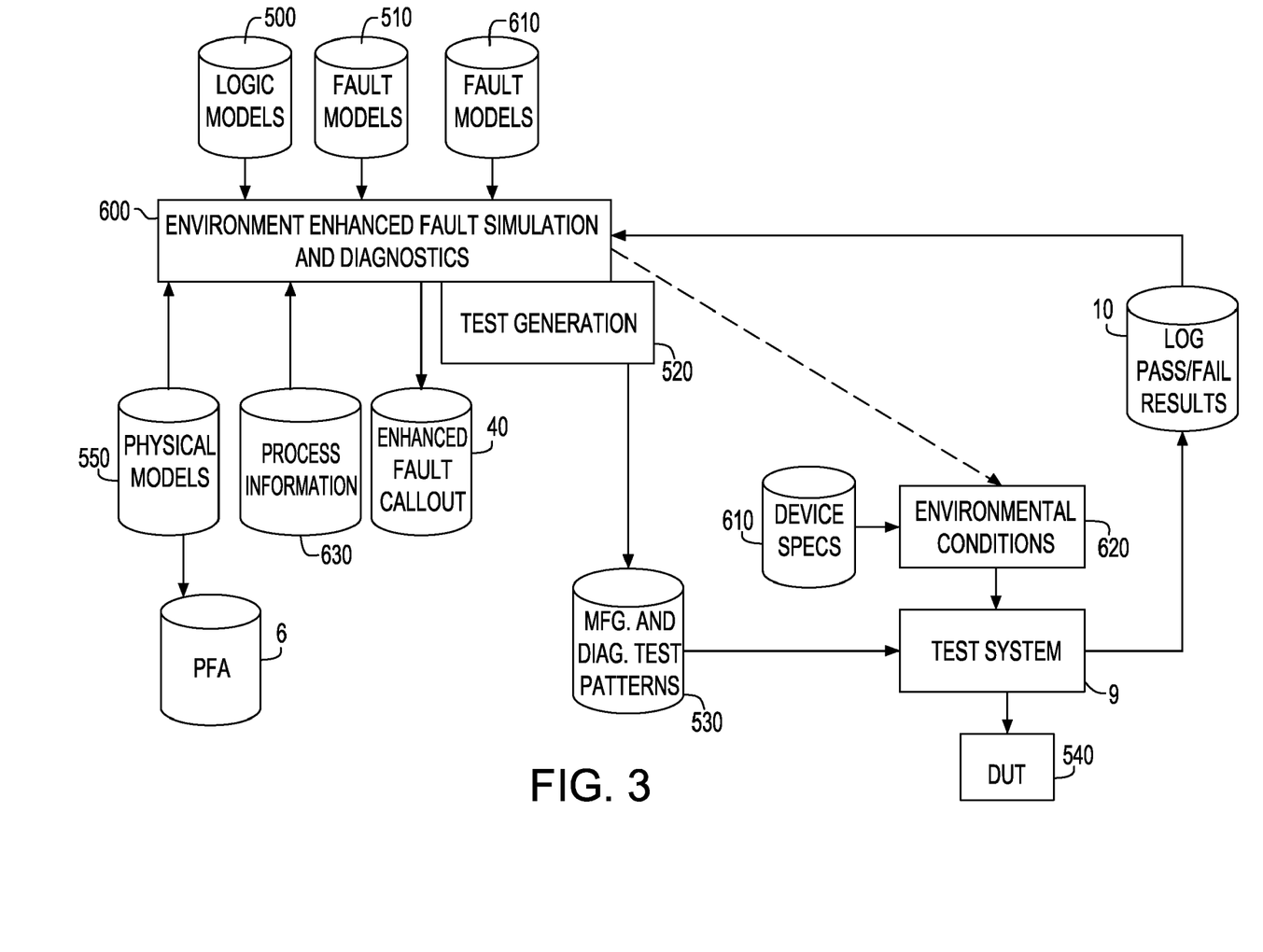
FIG. 3 is a diagram showing the environmentally enhanced diagnostic system according to an embodiment of the invention, wherein test patterns are applied to a DUT under a set of environment conditions and the environmental responses are fed to an enhanced simulation and callout algorithm with the resulting enhanced fault callout(s) being used for PFA.

Referring to FIG. 3, there is a diagram showing the environmentally enhanced diagnostic process using test patterns applied to a DUT at a defined set of environment conditions, and then feeding the environmental responses into an enhanced simulation and callout algorithm with the resulting enhanced fault callout(s) being used for PFA.

The test system has inputs from the manufacturing/diagnostic test patterns (530) and from the definition of the environmental conditions (620). These inputs are applied to the DUT (540). Outputs from the test system (9) include the pass/fail results (10). The environment enhanced fault simulation and diagnostic block (600) takes input from the pass/fail results (10), logic model (500), fault model (510) and as needed, the physical model (550). Provided from this fault simulation and diagnostic block (600) is an enhanced fault callout (40) to be sent for PFA (6).

Still referring to FIG. 3, there is shown a process using the environmentally enhanced diagnostic process. Using device specs (610) for the DUT (540), environment conditions (620) are defined for test. Input patterns (530) are applied at the tester (9) to the DUT (540) at the predefined environmental conditions (620). Environmentally aware pass/fail data is logged (10). This data is fed into an enhanced simulator with complex scoring (600) along with the logic model (500), fault model (510) and as needed the physical model (550), process information (630) and device specs (530). Resulting from the simulation and analysis is an enhanced fault callout (40), which is fed into Physical Failure Analysis (6) for failure resolution. Situations may arise where the resolution for fault callout (40) is insufficient for PFA (6). Additional test generation (520) may be needed with the new patterns (530) applied to the DUT (540). Environmental conditions (620) can also be modified for subsequent testing (9). This process repeats until the callout provides an adequate resolution.

Figure 4:
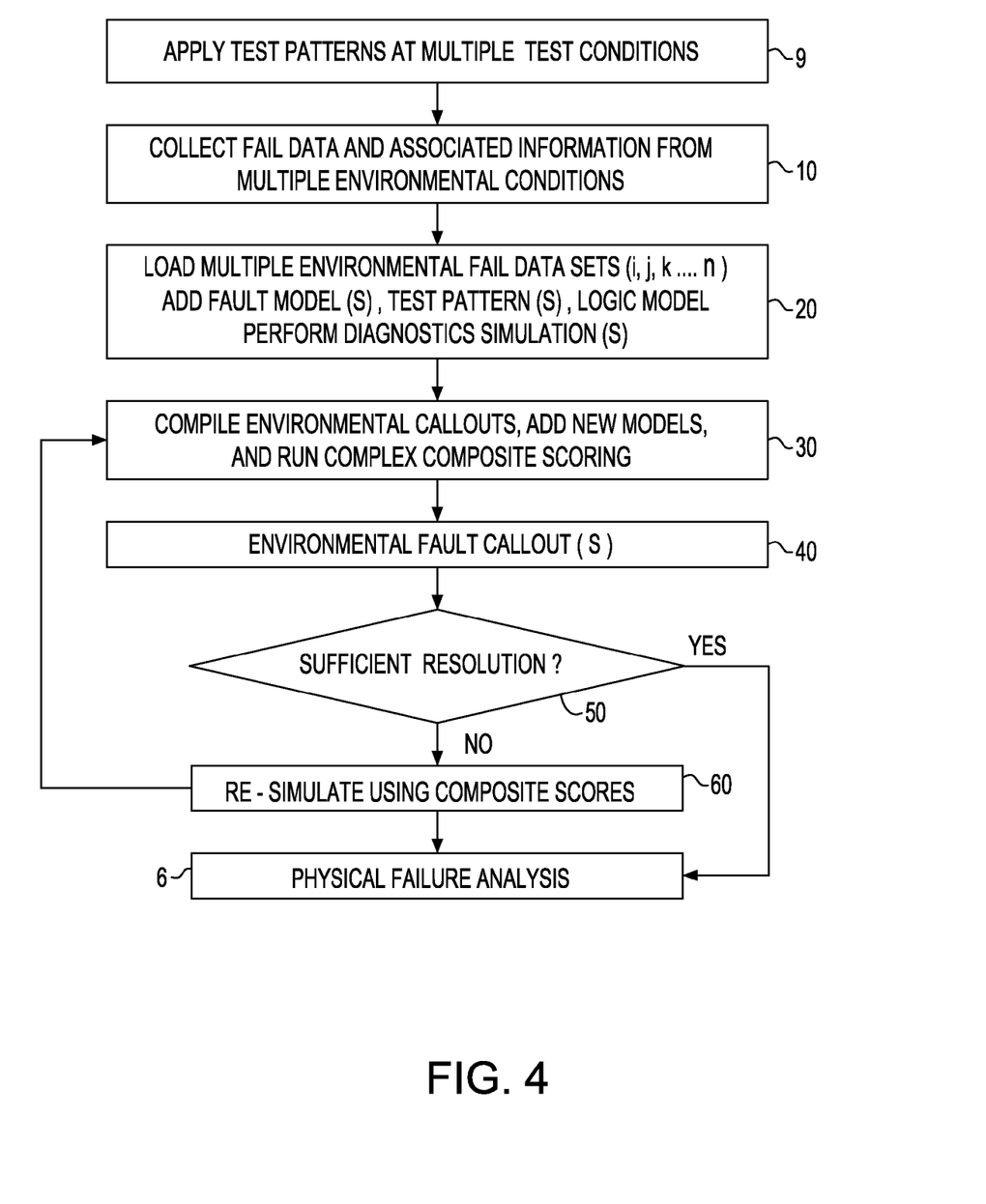
FIG. 4 illustrates the basic flow applicable to the enhanced diagnostics process, according to an embodiment of the present invention.

FIG. 4 depicts the basic flow of the environmental diagnostic resolution method. Test patterns are applied to the DUT while varying the environmental conditions (9). Fail data is collected for each application and stored with its respective environmental condition (10). Enhanced diagnostic simulations are then invoked utilizing all the data resulting in a more accurate, better localized, and higher fault resolution (20). While the new results have better resolution, more complex composite scoring algorithms are needed to collectively and independently weigh the results using the new environmental information (30). All results meeting the scoring metrics are then saved (40). New accuracy metrics are then applied (50) to determine if the all the failing patterns are explained and the results provide the resolution needed to proceed with Failure Analysis (6). If the metrics are not met, the process continues using iterative complex simulation and scoring methods with each simulation pass until the final resolution metric is met (60, 30, 40, and 50 respectively) to allow proceeding to Failure Analysis (6).

Figure 5A:
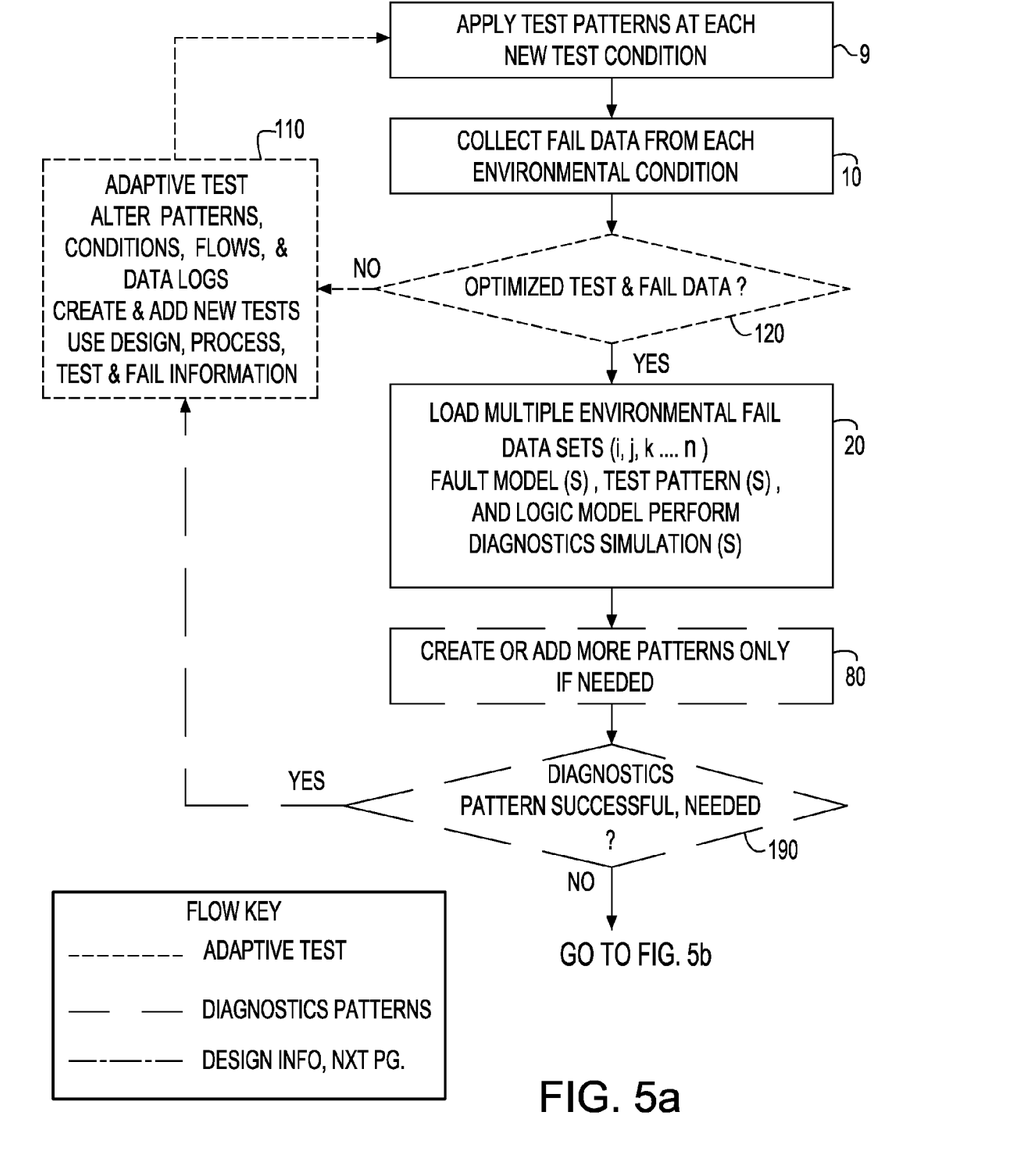
FIGS. 5a-5b illustrate a preferred embodiment of the invention that utilizes an adaptive test method when applying multiple environmental conditions.
Figure 5B:
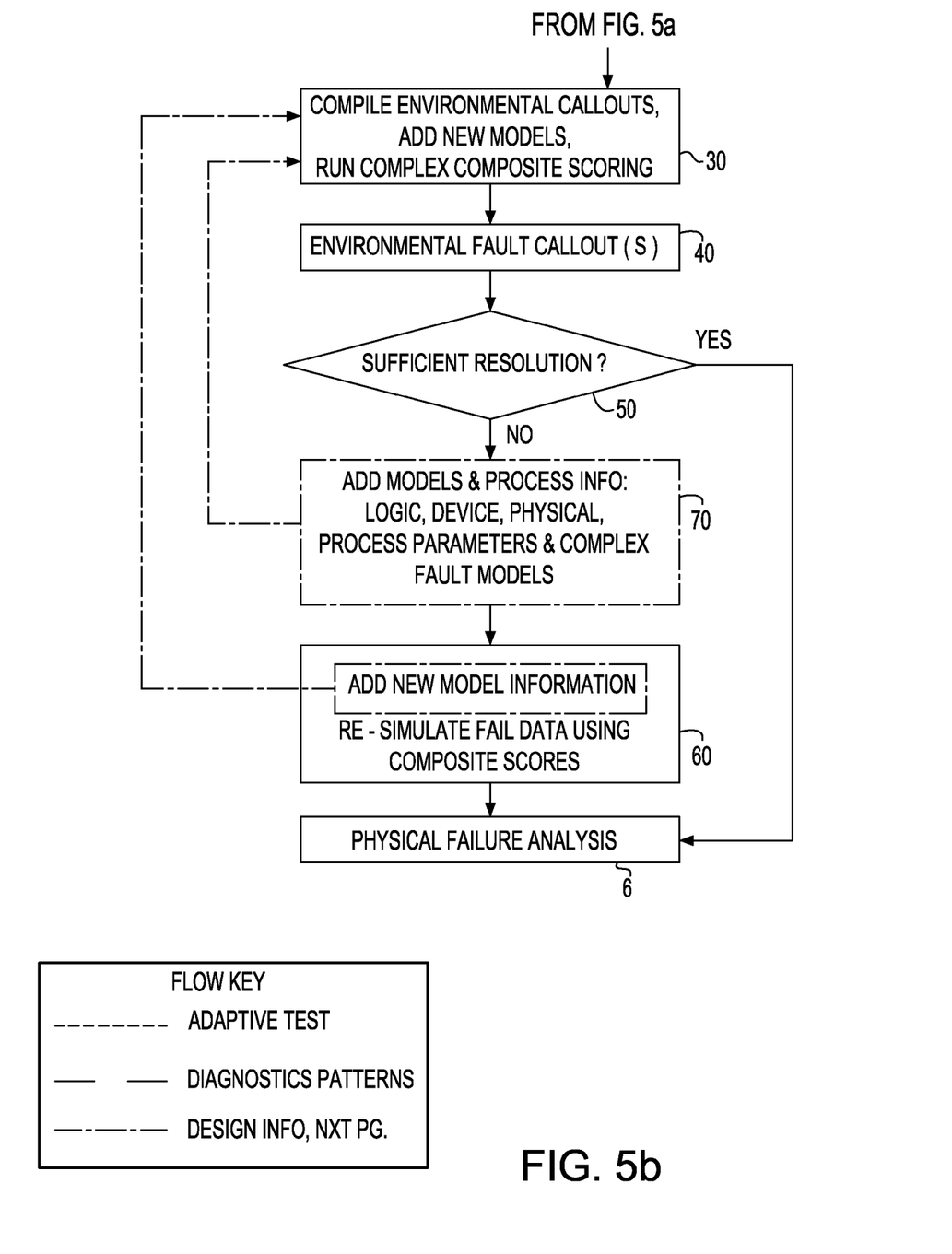

FIGS. 5a-5b illustrate an additional embodiment of the invention that utilizes an adaptive test method when applying multiple environmental conditions. This method dynamically alters test patterns, conditions, flows, data loggers, and creates new tests by dynamically analyzing the fail data and then optionally applies a predetermined set of test rules to alter or add tests and data logging for optimal adaptive fail data collection. This also illustrates another embodiment which creates a more focused set of diagnostics patterns for a partially isolated set of nets derived from the first pass collection of environmental fail data. A further invention embodiment is also included in this Figure that utilizes design and process information during the enhanced simulations.

Still referring to FIGS. 5a-5b, the complete flow with preferred embodiments of the present invention is illustrated. Each embodiment will be described in the order as they appear in the flow chart. Initial tests and flows are applied for the goal of environmental fail data collection (9). Fail data is first collected at each environmental condition (10). If test time permits, new adaptive test methods and flows provide means to steer the fail data collection by altering or adding patterns, tests, flows, and associated data logs using each successive test and fail data collection along with design and process parameters to build more targeted tests (120). More focused tests and data collections are then achieved as described in single or iterative passes of (9, 10, 120, and 110). Additionally, a wide variety of design and process parameters coupled with defect characteristics can affect circuit function and performance that causes fails not associated with the defects that are targeted by the fault isolation patterns. This may confuse the diagnostics engines that use test models designed to target these faults with each pattern.

Environmental diagnostics data enables extended adaptive test data sources (110) by stressing the design, process and defect fail characteristics at each environment. Optimized test and fail data analysis (120) are then performed followed by real time test changes (110) and retest (9) in an attempt to record only the fail data associated with the defect and removing the process systematic effects (10). This improves the data quality submitted to the enhanced diagnostics engine (20).

The fail data from each of these conditions is then fed into a diagnostics engine to be separately or simultaneously simulated (20). The complete set or a subset of fail data can be used. The fail data can be simulated in various ways. Methods include but are not limited to: simulations per environmental conditions and simulations across multiple environments. Sometimes diagnostics fail data is incomplete because fault isolation patterns do not exist, or they exist but they were not logged in.

If it is determined that a new pattern can help isolate the problem and it is not already available, new and more focused diagnostic patterns are generated using this new environmental diagnostics fail data (80). While this is not essential to the preset invention, it may further enhance the final callout resolution. If they are available (90) and test time permits, the patterns may be added to the test flow (110) and reapplied to the DUT at varying environmental conditions again for the generation of a more precise and reduced fail data set (9,10).

If the new diagnostic patterns are used (90), and the pattern decision and process is complete, the patterns are added to the flow (110), reapplied (9) and the results are logged (10). The diagnostic engine (20) then imports the test patterns used along with the logic test model and associated fail data sets (10) from a single or multiple chips at each failing environmental condition. The enhanced diagnostics engine then performs enhanced separate or simultaneous interactive simulations (20).

Referring to FIG. 5b, callouts are compiled (30) from available diagnostic simulations (20), with the resulting environmental fault callout stored (40). If it is determined that the callout has sufficient resolution (50) then the fault callouts are submitted to Physical Failure Analysis (6). Examples of scoring methods include but are not limited to: a cumulative scoring where the scores are summed up from each environment (30) or a differentiating scoring where environmental data is used to adjust the scores (60). If resolution is insufficient (50), additional information such as physical data and a variety of other models and data types can also be utilized (70). Optionally, the process iterates on the composite scoring (30) using additional data. While additional data and models are not necessary for their use in the enhanced environmental simulations and scoring processes, they are optionally included in the present flow as another possible resolution enhancement, if needed.

The environmental callout is then recorded along with its environmental data (40), metric measured (i.e., a predetermined acceptance score level) (50). This data may be used in any possible number of iterations or variations of this process in instances where it is determined that the proper callout or resolution has not been achieved to successfully complete the root cause failure analysis (6).

If the resolution is still unsatisfactory, any combination of additional information can be used for more focused and complex simulations (60) and iterative composite scoring in (30). Information that is advantageously used in complex simulations (60) includes but is not limited to: logic models, physical models, device models, process information (70). New complex fault models can be defined and used to create more patterns (80).

Re-simulation then begins after new information is inserted into the suspected failing devices and interconnects (60). Simulations continue until a predetermined precision is achieved. Iterative complex composite scoring algorithms are then reutilized for storing the newer, more precise, fault callouts (40). Statistical and environmentally weighted metrics will determine the accuracy of the fault resolution (50). If complete, the device can be submitted to physical failure analysis (6).

In summary, the present invention provides a novel approach that provides an enhanced diagnostic resolution and accuracy. The invention is effective to a wide selection of faults that includes un-modeled faults, AC faults, net-to-net defects, pattern sensitive faults, and the like. The present method is compatible with conventional test generation and diagnostic algorithms and is easily integrated in current test system architecture and test flow.

The method of the present invention also includes a possible reduction in fail data volume, and corresponding reduction in tester time, while concurrently providing a more effective test pattern set and thorough diagnostic reporting. Moreover, the inventive method is extendable to diagnostic "schmoo" analysis and environmental sensitivity.

Finally, the present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present invention has been particularly described in conjunction with exemplary embodiments, it is evident that many alternatives, modifications and variations will be apparent to those skilled in the art in light of the present description. It is therefore contemplated that the appended claims will embrace any such alternatives, modifications and variations as falling within the true scope and spirit of the present invention.

What is claimed is:

1. A method of extracting fail data on a device under test (DUT) by applying multiple applications of test patterns under different environmental test conditions the method comprising:
   a) applying said test patterns to said DUT under a plurality of said different environmental test conditions and collecting fail data resulting thereof;
   b) loading said collected fail data and performing diagnostic simulations based on said plurality of different environmental test conditions, said diagnostic simulations being executed on a computer;
   c) compiling environmental fault callouts thereof at a predetermined resolution; and
   d) performing a physical failure analysis on selected ones of said environmental fault callouts, wherein
   said environmental test conditions are selected from a group consisting of device design parameters and models, process parameters and variations thereof, physical data, logic model, and fault models included in said diagnostic simulations and fault callouts.

2. The method of claim 1, wherein step b) further comprises performing environmentally sensitive scoring until a scoring result at a predetermined confidence level is achieved.

3. The method of claim 1 wherein intersections of environmental based fail data determine fault resolutions.

4. The method of claim 3 wherein unions of said environmental based fail data determine said fault resolutions.

5. The method of claim 1 wherein said environment conditions are respectively associated with each set of said collected fail data.

6. The method of claim 5 wherein said environment conditions are respectively stored with each set of said collected fail data.

7. The method of claim 1 wherein said tests are reapplied to said DUT based upon said fault callouts by said running diagnostic simulations.

8. The method of claim 1 wherein said environmental conditions are adjusted based on results from said diagnostic simulation and said tests are reapplied with said adjusted environmental conditions.

9. The method of claim 1 wherein adaptive test patterns are generated based on results from said running diagnostic simulation and are reapplied to said DUT.

10. The method of claim 1 wherein a subset of patterns is reapplied to said DUT and followed by rerunning said diagnostic simulation and said fault resolution.

11. The method of claim 10 further comprising the step of rerunning said diagnostic simulation based on said fault callouts, with additional data being incorporated into follow-on diagnostic simulations and associated fault callouts.

12. The method of claim 1 wherein said faults callouts are modelled using a plurality of changing and interactive design, process, and test parameters to generate characteristics under a smaller set of logic circuits.

13. The method of claims 1 wherein said fault callouts are stored in a fault dictionary or library with their respective behaviours under a plurality of said environmental conditions.

14. A method for incorporating fail data from multiple applications of a set of test patterns under varying environmental test conditions when performing diagnostic simulation on a device under test (DUT), the method comprising:
   a) applying said set of test patterns to said DUT under defined environmental test conditions, said test conditions being different from one another;
   b) collecting fail responses associated with said different environmental test conditions;
   c) executing on a computer at least one diagnostic simulation and callout scoring that includes said failing data and the respective environmental test conditions; and
   d) performing a physical failure analysis when a predetermined final callout score is achieved, wherein
   said environmental test conditions are selected from a group consisting of device design parameters and models, process parameters and variations thereof, physical data, logic model, and fault models included in said diagnostic simulations and fault callouts.

15. The method of claim 14 wherein in step d) if said predetermined final callout score is not achieved, then said final score is regenerated until a predetermined confidence level is achieved.

16. The method of claim 15 wherein said regenerating of final callout score comprises:
   a) using adaptive test generation to create an enhanced set of test patterns;
   b) modifying and adjusting the environment conditions, and reapplying at least one subset of said test patterns; and
   c) incorporating additional design and process information to refine said callout score.

17. The method of claim 16 wherein said step c) said additional design and process information is selected from a group that consists of device data, physical data, process information, and alternate fault models.

18. A computer program product comprising a computer usable medium having computer readable program code means embodied therein for extracting fail data on a device under test (DUT) by applying multiple applications of test patterns under different environmental test conditions comprising:
   a) applying said test patterns to said DUT under a plurality of said different environmental test conditions and collecting fail data resulting thereof;
   b) loading said collected fail data and performing diagnostic simulations based on said plurality of different environmental test conditions, said diagnostic simulations;
   c) compiling environmental fault callouts thereof at a predetermined resolution; and
   d) performing a physical failure analysis on selected ones of said environmental fault callouts, wherein
   said environmental test conditions are selected from a group consisting of device design parameters and models, process parameters and variations thereof, physical data, logic model, and fault models included in said diagnostic simulations and fault callouts.

* * * * *